(12) United States Patent
Ghionis

(10) Patent No.: US 9,612,368 B2
(45) Date of Patent: Apr. 4, 2017

(54) LIGHT REFLECTOR

(71) Applicant: Jerry Ghionis, Beverly Hills, CA (US)

(72) Inventor: Jerry Ghionis, Beverly Hills, CA (US)

(73) Assignee: Jerry Ghionis, Beverly Hills, CA (US)

( * ) Notice: Subject to any disclaimer, the term of this patent is extended or adjusted under 35 U.S.C. 154(b) by 0 days.

(21) Appl. No.: 14/852,717

(22) Filed: Sep. 14, 2015

(65) Prior Publication Data

US 2016/0077245 A1    Mar. 17, 2016

Related U.S. Application Data

(60) Provisional application No. 62/051,029, filed on Sep. 16, 2014.

(51) Int. Cl.
| | | |
|---|---|---|
| *G02B 5/00* | (2006.01) | |
| *G03B 15/06* | (2006.01) | |
| *G02B 5/08* | (2006.01) | |

(52) U.S. Cl.
CPC ............ *G02B 5/005* (2013.01); *G03B 15/06* (2013.01); *G02B 5/0808* (2013.01)

(58) Field of Classification Search
CPC ...... G02B 5/136; G02B 27/2292; G02B 5/08; G02B 5/003; G02B 5/005; G02B 5/808; G02B 5/816; G02B 17/00; G02B 17/061; G02B 21/0032; G02B 27/10; G02B 15/06; G03B 15/03; G03B 15/06; F21V 1/06; F21V 1/16; F21V 11/10; F21V 11/12; F21V 13/00; F21V 13/08; F21V 7/22

See application file for complete search history.

(56) References Cited

U.S. PATENT DOCUMENTS

| | | | |
|---|---|---|---|
| 2,876,338 A | | 4/1956 | Seligson |
| 3,115,311 A | | 12/1963 | Miller |
| 3,614,449 A | * | 10/1971 | Ward, III ............... G01S 17/66 |
| | | | 250/203.2 |
| 3,858,046 A | * | 12/1974 | Cubalchini ............ G01S 3/781 |
| | | | 250/203.1 |
| 4,068,931 A | | 1/1978 | Weaks |
| 4,075,472 A | | 2/1978 | Higuchi |
| 4,441,141 A | | 4/1984 | Lo |
| 4,737,890 A | | 4/1988 | Bartholomew |
| 4,746,205 A | * | 5/1988 | Cross .................... G02B 5/003 |
| | | | 359/503 |
| 4,757,425 A | | 7/1988 | Waltz |
| 4,807,089 A | | 2/1989 | Nussli |
| 5,154,503 A | | 10/1992 | Sternsher |
| D335,717 S | | 5/1993 | Couch |

(Continued)

FOREIGN PATENT DOCUMENTS

| | | |
|---|---|---|
| WO | WO8201258 | 4/1982 |
| WO | WO2009099970 | 8/2009 |

*Primary Examiner* — Hargobind S Sawhney
(74) *Attorney, Agent, or Firm* — Emch, Schaffer, Schaub & Porcello Co., L.P.A.

(57) ABSTRACT

A light modifier that can be used in image capture is described. The light modifier has a planar body having a first surface and a second surface. An aperture is disposed in the planar body. The aperture extends through the first and second surfaces. Other objects and advantages of the present invention will become apparent to those skilled in the art upon a review of the following detailed description of the preferred embodiments and the accompanying drawings.

18 Claims, 5 Drawing Sheets

(56) References Cited

U.S. PATENT DOCUMENTS

| | | | |
|---|---|---|---|
| 6,513,955 B1 | 2/2003 | Waltz | |
| 6,709,121 B1* | 3/2004 | Lowe | G03B 15/06 |
| | | | 362/18 |
| 7,246,925 B2 | 7/2007 | Waltz et al. | |
| 7,360,909 B1 | 4/2008 | Hughes | |
| 7,612,735 B2 | 11/2009 | Essig, Jr. et al. | |
| 8,867,136 B2* | 10/2014 | Hashikawa | G02B 17/006 |
| | | | 353/10 |
| 2010/0231860 A1* | 9/2010 | Maekawa | G02B 5/08 |
| | | | 353/10 |
| 2011/0017412 A1* | 1/2011 | Macneil | B60J 1/2011 |
| | | | 160/370.21 |

* cited by examiner

LIGHT REFLECTOR

CROSS REFERENCE TO RELATED APPLICATIONS

This application claims the benefit of U.S. provisional patent application Ser. No. 62/051,029 filed Sep. 16, 2014.

BACKGROUND OF THE INVENTION

The present invention relates to a light modifier as used in the image capture industry, such as, photography, video or other relatively well known mediums. The modifier is used to achieve the type of lighting that is desirable to capture the image of the subject. Ambient or artificial lighting can be used with the modifier of the present invention.

Each particular area and subject that is to be lighted will dictate the type and intensity of light that is needed. In some applications, direct light from the light source without any alteration may be required. In other situations direct light maybe to strong or cast overly distinct shadows on the subject. In other applications, more indirect or diffused light maybe necessary to create the proper lighting effect. It is desirable to have a light modifier that is a self-contained unit that is easy to position and use and can create several different types of lighting effects on a subject.

It is therefore, an object of the present invention to provide a light modifier which will create varying types of light effects on a subject.

It is another object of the present invention to provide a light modifier that is capable of producing the various lighting effects while still being lightweight, compact and easily transported and stored.

It is a further object of the invention to provide a light modifier that is useable with a wide variety of light sources.

Other objects and advantages of the present invention will become more apparent from a review of the following specification, drawings and claims.

SUMMARY OF THE INVENTION

A light modifier that can be used in image capture is described. The light modifier has a planar body having a first surface and a second surface. An aperture is disposed in the planar body. The aperture extends through the first and second surfaces. Other objects and advantages of the present invention will become apparent to those skilled in the art upon a review of the following detailed description of the preferred embodiments and the accompanying drawings.

DETAILED DESCRIPTION OF THE PREFERRED EMBODIMENT

Figure 1:
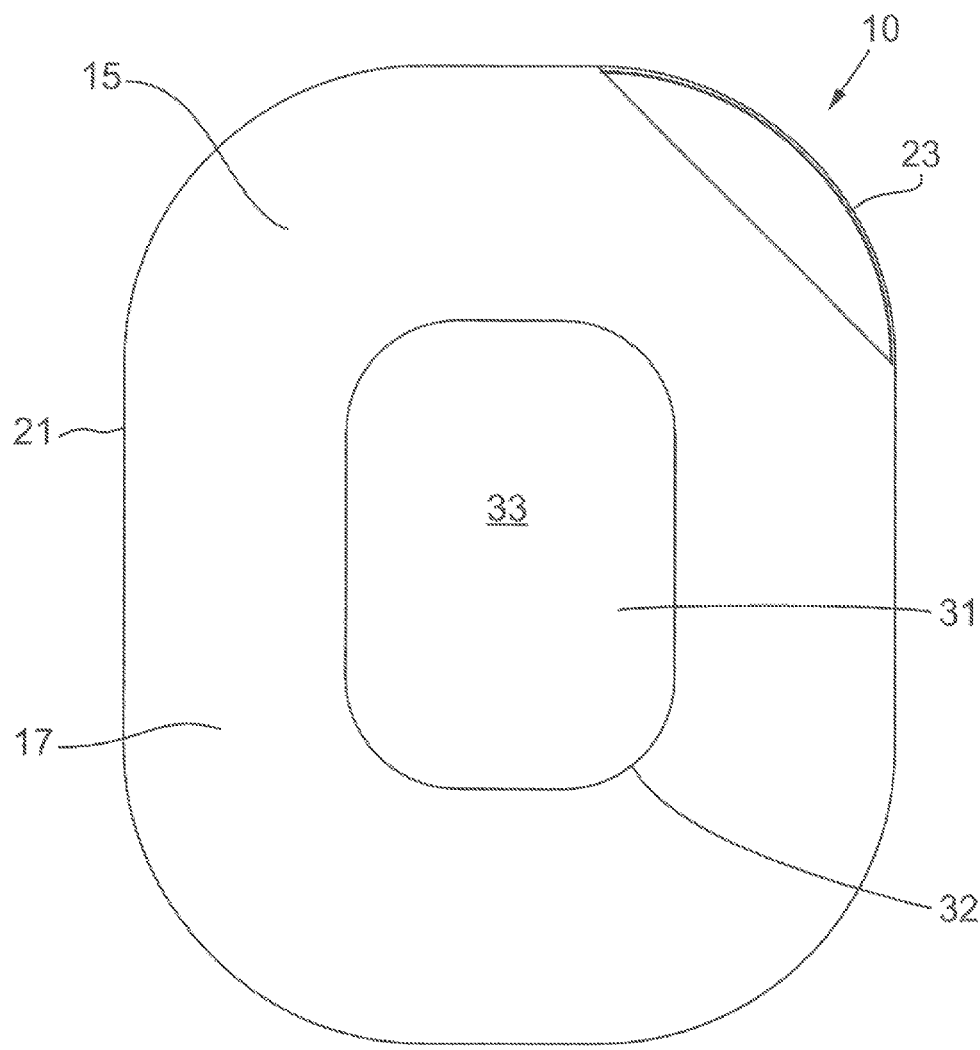
FIG. 1 is a front elevational view of the light modifier.
Figure 2:
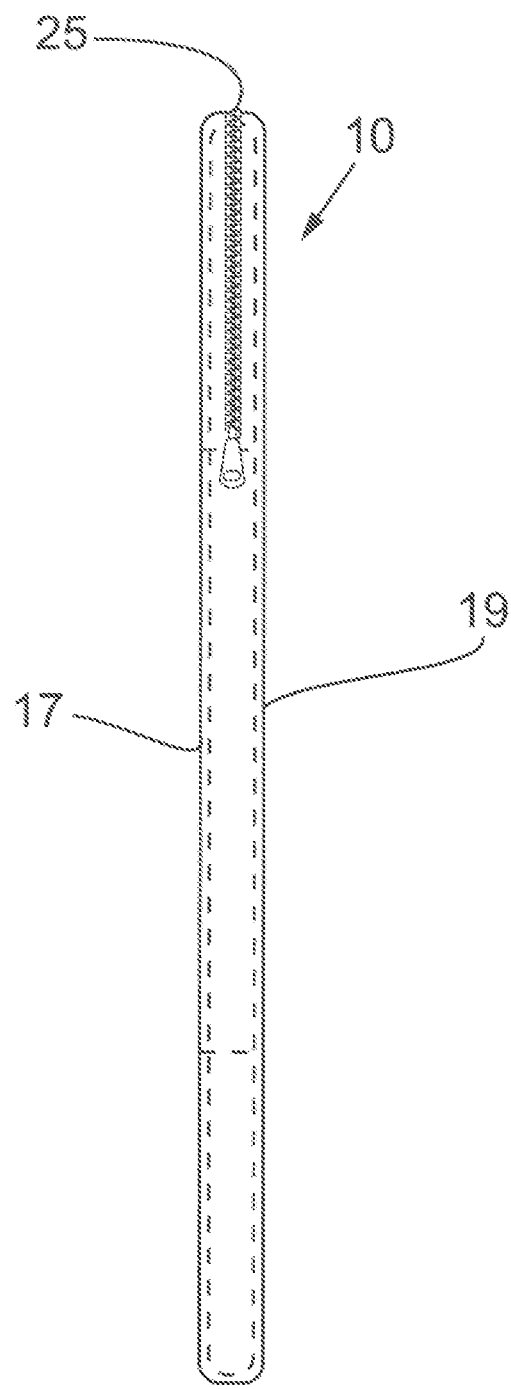
FIG. 2 is a side elevational view.
Figure 3:
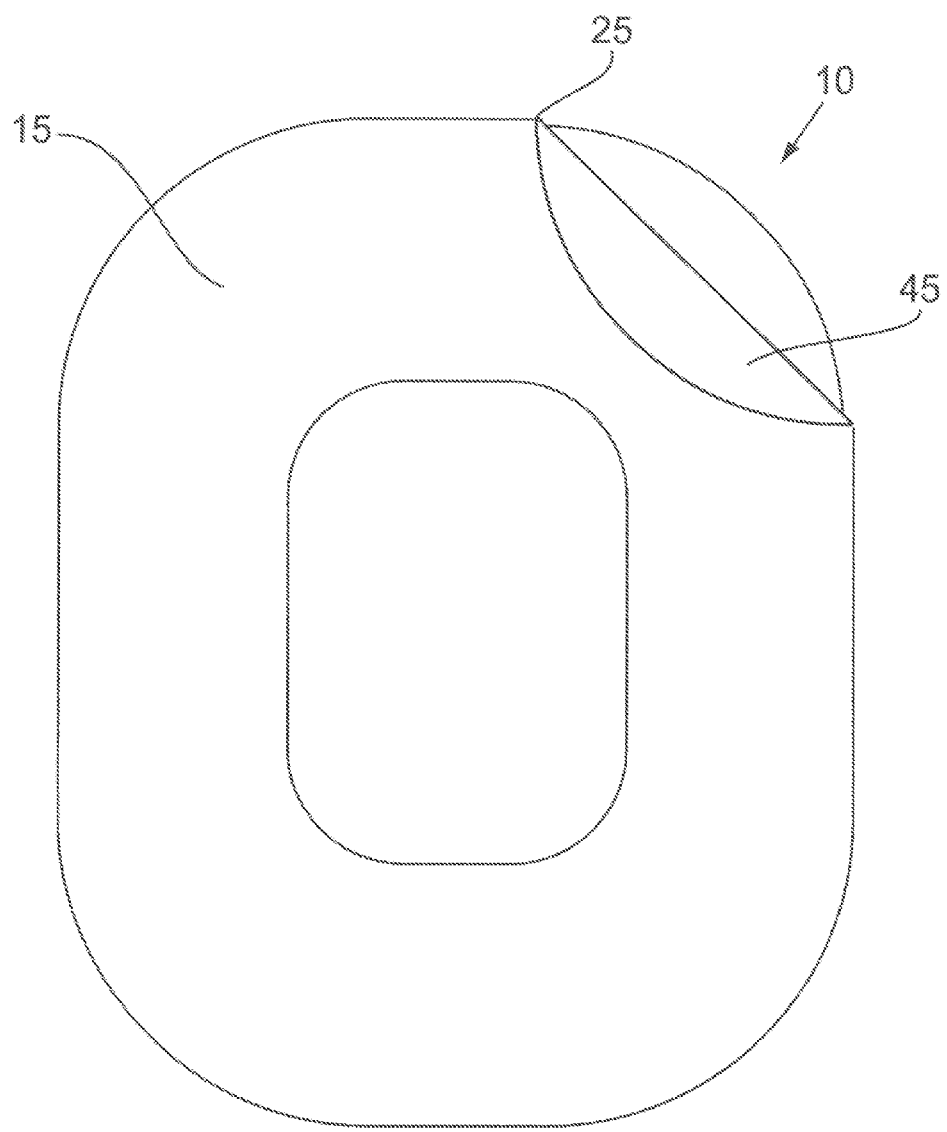
FIG. 3 is a front elevational view.
Figure 4:
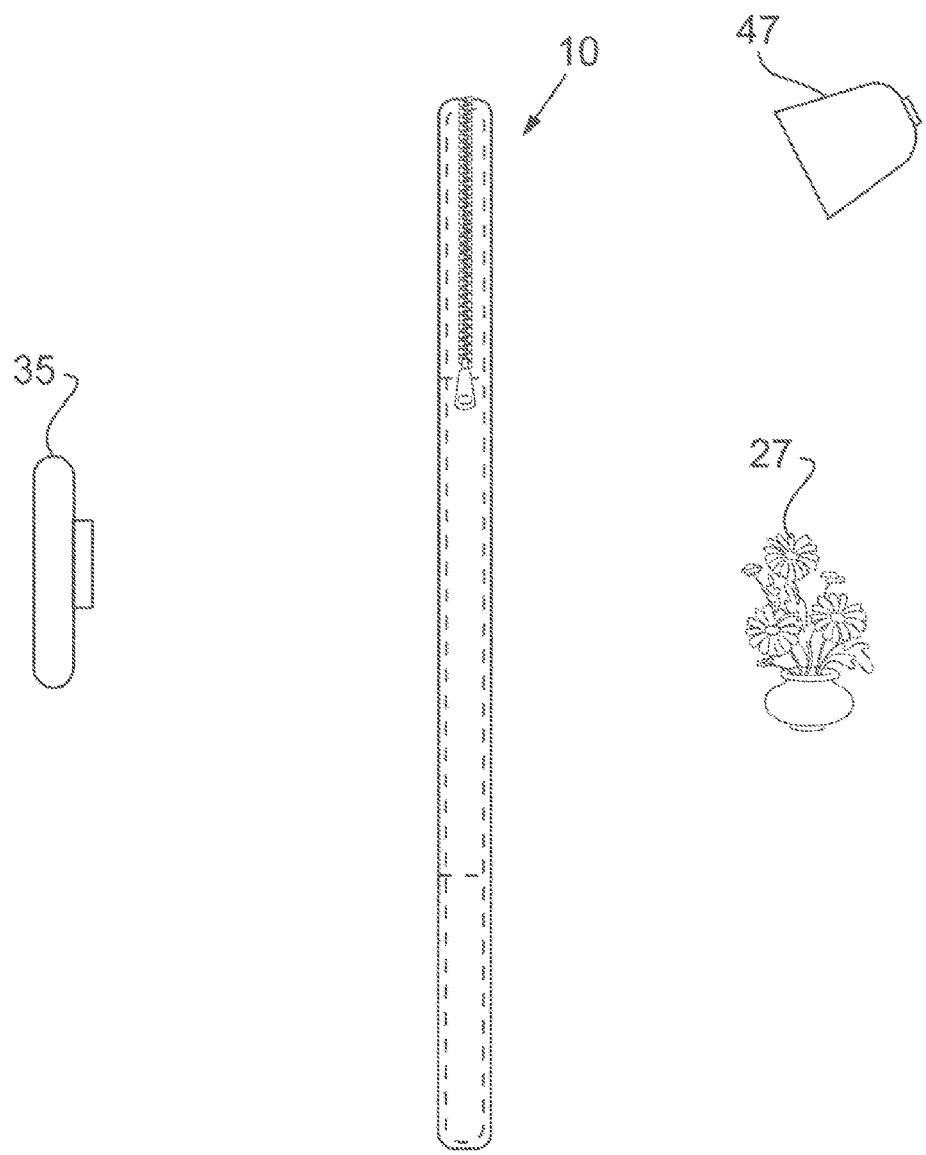
FIG. 4 is a side elevational view.
Figure 5:
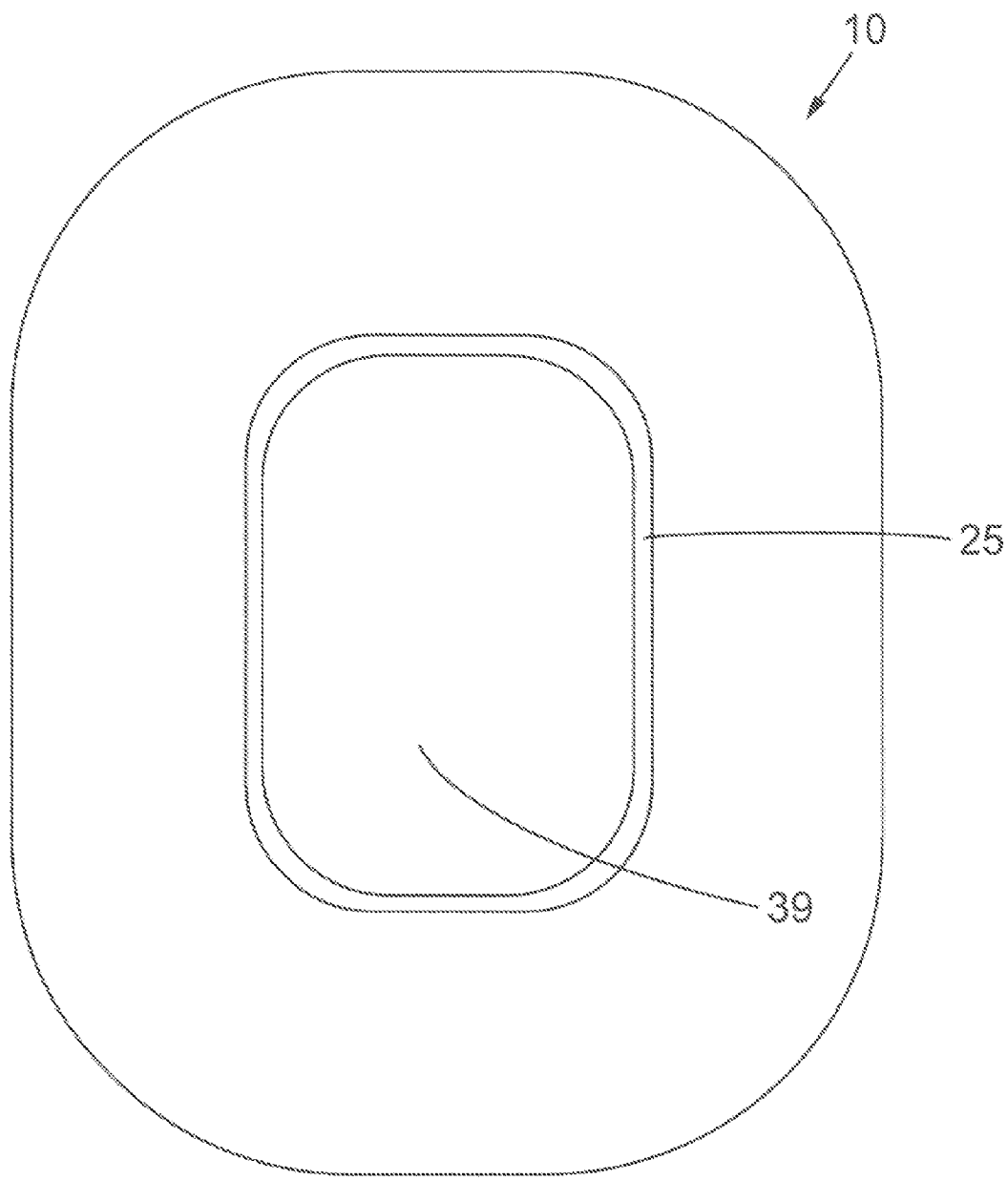
FIG. 5 is a front elevational view.

The invention is directed to a light modifier that is used in the image capture industry. The light modifier is utilized to change the lighting conditions on the subject of the image capture. The light modifier has the ability to change the lighting conditions on the subject in a variety of ways that have not been obtainable by light modification devices previously used in the industry. The details of the invention will be more readily understood by referring to the attached drawings in connection with the following description.

The light modifier 10 has a planar body having a first surface 17 and second surface 19. The first surface is positioned in adjacent relationship to the second surface. A flexible frame 23 extends around the outer periphery 21 of the planar body. The outer periphery of the first surface 17 and the outer periphery of the second surface 19 can be secured together around the flexible frame 23 to form the planar body 15. A releasable securing means 25 can be utilized to secure the first surface to the second surface on the outer periphery 21. The releasable securing means can be a zipper, Velcro fastener or similar releasable securing device. Although the planar body 15 has been shown to be substantially rectangular in shape it should be understood that other geometrical shapes can be utilized for the planar body. A circular, triangular, hexagonal, octagonal or other geometric shapes can be used for the planar body.

An aperture 31 is positioned in the planar body 15 and extends through the first surface 17 through the second surface 19. The aperture 31 provides a passageway 33 through the planar body 15. The aperture 31 usually has the same geometric shape as the geometric shape of the planar body 15. However, it should be understood that different geometric shapes can be used for the planar body 15 and the aperture 31 if desired. The aperture 31' can have the same range of possible geometric shapes as previously discussed with regard to the planar body. The aperture 31 is usually positioned in the center of the planar body 15 but it should be understood that such placement is not mandatory. The aperture 31 usually has an area that is from about 5% to about 90% of the surface area of the planar body 15. In practice, it has been found preferable to have the aperture have a size that is from about 10% to about 40% of the surface area of the planar body 15.

In most applications the first surface 17 of the planar body 15 is made of a dark material that blocks or absorbs sunlight or artificial light that is used as part of the image capture. The second surface 19 is usually a material with a reflective surface that reflects the sunlight or artificial light used in the image capture process. The second surface 19 can be made of a white material that softens and reflects the available light without changing the color temperature seen on the subject that is to be captured. The second surface 19 can also be a material with a reflective silver color that reflects the available light to add cool specularity and sharp highlights to the subject. The second surface 19 can also be a material with a silver and gold reflective surface that adds a hint of warmth and subtle specularity as it reflects the available light. It should be appreciated that the first and second surfaces can be made of the same material or fabric having identical light modification characteristics or that the first and second surfaces can be made of fabrics selected from any of the light modification fabrics described for the first and second surfaces. The fabrics that are used for the first and second surfaces can be cloth, nylon, vinyl or other materials well known in the light modification industry.

In use the light modifier 10 will be positioned adjacent the subject 27 that is to be captured. The light modifier can be positioned so that the first or second surface faces the subject. If the surface that faces the subject is a reflective surface the ambient or artificial light available will be reflected towards the subject and create a different lighting condition. If the surface of the planar body that faces the subject is a dark or absorptive surface the ambient or artificial light being used will be absorbed by this surface and create a reduced light around the subject. In most applications the image capture device 35, such as a camera, will be positioned on one side of the light modifier 10 and the subject that is to be captured will be positioned on the other side of the light modifier. The image capture device can be positioned so that it sees the subject through the passageway 33 formed by the aperture 31. It should be appreciated, however, that the image capture device 35 does not have to be positioned to capture the image through the passageway 33. The light modifier 10 can be positioned adjacent to the subject to create a desired lighting effect and the image capture device can be positioned outside of the light modifier 10. The light modifier can be utilized to absorb or block unlighted white light, reflect the ambient or artificial light, create shafts of light on the subject or other interesting lighting arrangements.

An additional feature of the invention is that the aperture 31 can be designed with a releasable securing means 25 around the outer perimeter 32 of the aperture. The releasable securing means can be utilized to position a panel 39 on the planar body 15 that essentially closes or removes aperture 31. The panel 39 can be positioned on the first surface 17, positioned on the second surface 19 or be positioned on both the first and second surface. The panel 39 normally is of the same material as the material of the first surface or the material of the second surface. It should be appreciated, however, that the panel could be of a different material then the first or second surface and that this would create additional lighting patterns on the subject that is to be captured. In some applications it might be desirable to have the panel 39 be a filter or scrim that would further modify the lighting variations that could be created for the subject that is to be captured.

It is also possible to have additional panels releasably secured around the outer periphery of the planar body 15 by releasable securing means 25. The releasable fabric panels would increase the options that are available to the user of the light modifier for reflecting and absorbing the light that is to be directed to the subject that is to be captured. The various fabric panels could be positioned on the planar body 15 and held in place by the releasable securing means 25.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

What I claim:

1. A light modifier used in image capture comprising:
   a planar body made of a fabric material having a first surface that can be disposed towards an image, and a second surface that can be disposed towards an image capture device; the first and second surfaces are selected from the group of fabrics having one of the following characteristics: a dark material that absorbs light, a reflective material that reflects light, a light colored fabric that softens and reflects light, a silver colored fabric that reflects light to sharpen highlights, or a gold and silver fabric that adds warmth and specularity as it reflects the available light;
   an aperture disposed in the planar body, the aperture extending through the first and second surfaces; and
   a panel releasably secured to the perimeter of the aperture.

2. The modifier of claim 1 wherein the aperture is positioned substantially in the center of the first and second surfaces of the body.

3. The modifier of claim 1 wherein the aperture has an area that is from about 5% to about 90% of the area of the first or second surfaces.

4. The modifier of claim 3 wherein the first and second surface of the planar body and the aperture have a substantially rectangular shape.

5. The modifier of claim 3 wherein the aperture has a substantially circular shape.

6. The modifier of claim 1 wherein the first surface is a reflective material.

7. The modifier of claim 1 wherein the first surface is a light absorbing material.

8. The modifier of claim 1 wherein the second surface is a reflective material.

9. The modifier of claim 1 wherein the second surface is a light absorbing material.

10. The modifier of claim 1 wherein the aperture creates a passageway and an image capture device is disposed to view the image through the aperture.

11. The modifier of claim 1 wherein a light source can be positioned adjacent the modifier.

12. The modifier of claim 11 wherein the light source cab be positioned to direct light on the first or second surface.

13. The modifier of claim 1 wherein the panel is the same material as the material of the first or second surfaces.

14. The modifier of claim 1 wherein the panel is a material different than the material of the first and second surfaces.

15. The modifier of claim 1 wherein the first surface is disposed adjacent the second surface.

16. The modifier of claim 15 wherein the first and second surfaces are essentially the same size and shape.

17. The modifier of claim 1 wherein the panel is the same material as the material of the first and second surfaces.

18. The modifier of claim 1 wherein the panel is a material different than the material of the first and second surfaces.

* * * * *